(12) United States Patent
Matsui et al.

(10) Patent No.: US 10,173,580 B2
(45) Date of Patent: Jan. 8, 2019

(54) LIGHTING CIRCUIT AND VEHICLE LAMP

(71) Applicant: KOITO MANUFACTURING CO., LTD., Tokyo (JP)

(72) Inventors: Kotaro Matsui, Shizuoka (JP); Takao Sugiyama, Shizuoka (JP); Susumu Ogo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 3 days.

(21) Appl. No.: 15/662,095

(22) Filed: Jul. 27, 2017

(65) Prior Publication Data

US 2018/0029526 A1 Feb. 1, 2018

(30) Foreign Application Priority Data

Jul. 29, 2016 (JP) ................. 2016-150246

(51) Int. Cl.
*B60Q 1/14* (2006.01)
*B60Q 11/00* (2006.01)
*H05B 33/08* (2006.01)

(52) U.S. Cl.
CPC ............ *B60Q 1/1423* (2013.01); *B60Q 11/00* (2013.01); *B60Q 11/002* (2013.01); *H05B 33/0884* (2013.01)

(58) Field of Classification Search
CPC ............... H05B 37/02; H05B 37/0281; H05B 33/0842; H05B 33/0845; H05B 33/0851; H05B 39/02; H05B 39/047; H05B 33/0815; H05B 33/0806; Y02B 20/144; B60Q 11/00; B60Q 1/1423; B60Q 11/002; B60Q 1/1415; B60Q 2300/146; H02M 3/33507; H02M 3/156

See application file for complete search history.

(56) References Cited

U.S. PATENT DOCUMENTS

| 7,768,759 | B2 * | 8/2010 | Yabe ................. H03K 17/08122 361/103 |
| 7,880,401 | B2 * | 2/2011 | Kitagawa ........... H05B 33/0845 315/185 S |
| 8,089,169 | B2 * | 1/2012 | Maeda .................. H02J 7/1461 290/40 C |
| 8,928,244 | B2 * | 1/2015 | Kikuchi ............. H05B 33/0851 315/291 |
| 9,423,095 | B2 * | 8/2016 | Yoshikawa ............. F21V 29/60 |
| 9,967,948 | B2 * | 5/2018 | Kambara ................ F21V 23/02 |
| 9,992,835 | B2 * | 6/2018 | Matsui ............... H05B 33/0845 |
| 2018/0014395 | A1 * | 1/2018 | Ichikawa ........... H05B 37/0281 |

FOREIGN PATENT DOCUMENTS

EP 2200406 A2 6/2010
JP 2010147220 A 7/2010

* cited by examiner

*Primary Examiner* — Haissa Philogene
(74) *Attorney, Agent, or Firm* — Osha Liang LLP (57) ABSTRACT

A lighting circuit which lights a semiconductor light source, the lighting circuit includes a drive circuit configured to receive a PWM signal from a controller, to generate a drive current to the semiconductor light source, and to switch the drive current according to the PWM signal. When a non-input state of the PWM signal exceeds a predetermined time, the lighting circuit is configured to assert an abnormality detection signal and to output the abnormality detection signal to the controller.

8 Claims, 5 Drawing Sheets

LIGHTING CIRCUIT AND VEHICLE LAMP

CROSS-REFERENCE TO RELATED APPLICATION

The present application claims priority from Japanese Patent Application No. 2016-150246 filed on Jul. 29, 2016, the entire content of which is incorporated herein by reference.

BACKGROUND

Technical Field

The present invention relates to a lighting circuit for a lamp used for an automobile or the like and a vehicle lamp including the lighting circuit.

Halogen lamps or HID (High Intensity Discharge) lamps have been mainly used as a light source of a vehicle lamp, particularly, a headlamp. However, in recent years, instead of these lamps, development for a vehicle lamp using a semiconductor light source such as an LED (light emitting diode) or an LD (semiconductor laser) has been advanced.

Figure 1:
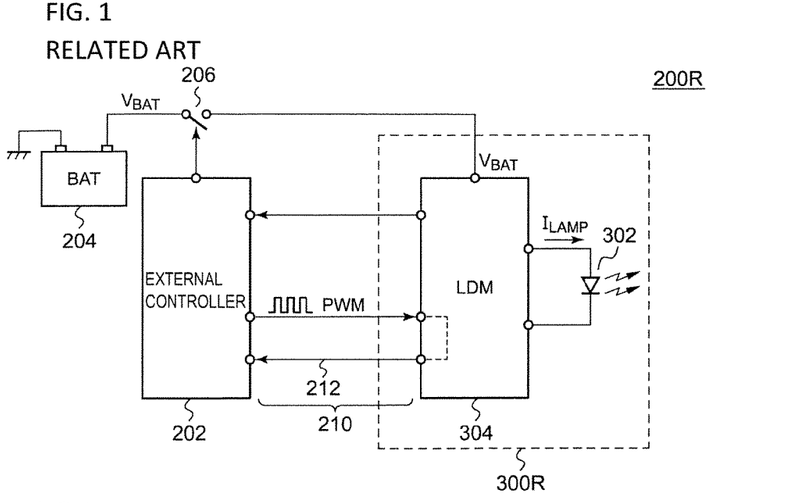
FIG. 1 is a block diagram of a lamp system studied by the present inventors.

As a method of controlling the amount of light of a semiconductor light source, an analog dimming in which the amount (amplitude or peak value) of a drive current (lamp current) is changed and a PWM (Pulse Width Modulation) dimming in which a drive current is switched and a duty ratio of the switching is changed have been known. FIG. 1 is a block diagram of a lamp system 200R studied by the present inventors. The lamp system 200R includes an external controller 202, a battery 204, a switch 206, and a vehicle lamp 300R. The external controller 202 is also referred to as an ECU (Electronic Control Unit) and includes a microcomputer (processor) for controlling the vehicle lamp 300R.

The ECU 202 turns on the switch 206 when turning on the vehicle lamp 300R. In this way, a battery voltage $V_{BAT}$ is supplied to the vehicle lamp 300R. Further, the ECU 202 generates a PWM signal indicating the amount of light of the vehicle lamp 300R in conjunction with the turn on of the switch 26 and inputs the PWM signal to the vehicle lamp 300R.

The vehicle lamp 300R includes a semiconductor light source 302 and a drive circuit 304. When the semiconductor light source 302 is an LED, the drive circuit 304 is also referred to as an LDM (LED Driver Module). The drive circuit 304 includes a constant current output switching converter and a controller for the switching converter. The drive circuit 304 switches a lamp current $I_{LAMP}$ supplied to the semiconductor light source 302 according to the PWM signal. Further, when an abnormality of the vehicle lamp 300R is detected, the drive circuit 304 asserts a diagnostic signal DG and notifies it to the ECU 202.

Patent Document 1: Japanese Patent Laid-Open Publication No. 2010-147220

In this lamp system 200R, the ECU 202 and the vehicle lamp 300R are electrically connected by a wire harness 210. When an abnormality such as disconnection occurs in this wire harness 210, the PWM signal is not supplied to the drive circuit 304, and thus, the amount of light of the semiconductor light source 302 becomes uncontrollable. For this reason, an abnormality detection function of the wire harness 210 is required.

In order to solve the above problem, a return line 212 is provided in the wire harness 210 and a PWM signal bypassing the inside of the drive circuit 304 is returned to the ECU 202. The ECU 202 compares the transmitted PWM signal and the returned PWM signal. When these signals coincide (match), it can be determined as a normal state. When these signals do not coincide (unmatch), it can be determined as an abnormal state.

However, in the abnormality detection method of FIG. 1, the return line 212 is necessary and an extra pin for return is necessary on the side of the ECU 202 or the drive circuit 304. Therefore, the connection of the lamp system 200R becomes complicated.

SUMMARY

Exemplary embodiments of the invention provide a lighting circuit and a vehicle lamp which can provide an improved abnormality detection technique.

A lighting circuit which lights a semiconductor light source, according to an exemplary embodiment, comprises a drive circuit configured to receive a PWM signal from a controller, to generate a drive current to the semiconductor light source, and to switch the drive current according to the PWM signal, wherein, when a non-input state of the PWM signal exceeds a predetermined time, the lighting circuit is configured to assert an abnormality detection signal and to output the abnormality detection signal to the controller.

According to this aspect, a unit which detects an abnormality of the PWM signal is provided on the side of the lighting circuit, and the detection result is notified to the controller. As a result, the return line of the wire harness becomes unnecessary.

A supply start of the PWM signal by the controller and a start of power supply to the lighting circuit by the controller may be synchronized. In this way, the lighting circuit can measure the non-input state of the PWM signal by using the supply of power as a trigger.

An abnormality detection signal indicating an abnormality of the lighting circuit and an abnormality detection signal indicating an abnormality of the PWM signal may be logically synthesized and supplied to the controller via a single signal line.

The drive circuit may include a converter and a converter controller configured to control the converter according to the PWM signal. The converter controller may include a timer circuit configured to detect the non-input state of the PWM signal continuing for a predetermined time.

The timer circuit may be provided outside the converter controller.

The converter controller may comprise a regulator configured to generate a power supply voltage used in the lighting circuit, and to shut down the power supply voltage when the non-input state of the PWM signal continuing for the predetermined time is detected, so that the abnormality detection signal supplied to the controller is in an asserted state.

Another aspect of the present invention relates to a vehicle lamp. The vehicle lamp may include a semiconductor light source, and the lighting circuit according to one of the above aspects.

According to an aspect of the present invention, it is possible to detect an abnormality of the PWM signal.

DETAILED DESCRIPTION

Hereinafter, based on preferred embodiments, the present invention will be described with reference to the drawings. The same or similar constituent elements, members or processes shown in each drawing are denoted by the same reference numerals, and the repeated explanations are omitted as appropriate. Further, the embodiment is not intended to limit the invention but is an example. All the features described in the embodiment and combinations thereof are not necessarily essential to the invention.

In the present specification, a state represented by the phrase "a member A is connected to a member B" includes a state in which the member A is indirectly connected to the member B via another member that does not substantially affect the electric connection state therebetween or that does not impair the function or effect exhibited by their connection, in addition to a state in which the member A is physically and directly connected to the member B.

Similarly, a state represented by the phrase "a member C is provided between a member A and a member B" includes a state in which the member A is indirectly connected to the member C or the member B is indirectly connected to the member C via another member that does not substantially affect the electric connection state therebetween or that does not impair the function or effect exhibited by their connection, in addition to a state in which the member A is directly connected to the member C or a state in which the member B is directly connected to the member C.

Further, in the present specification, the symbols attached to electrical signals such as voltage signals and current signals or circuit elements such as resistors and capacitors respectively represent voltage values and current values or resistance values and capacitance values, as necessary.

Figure 2:
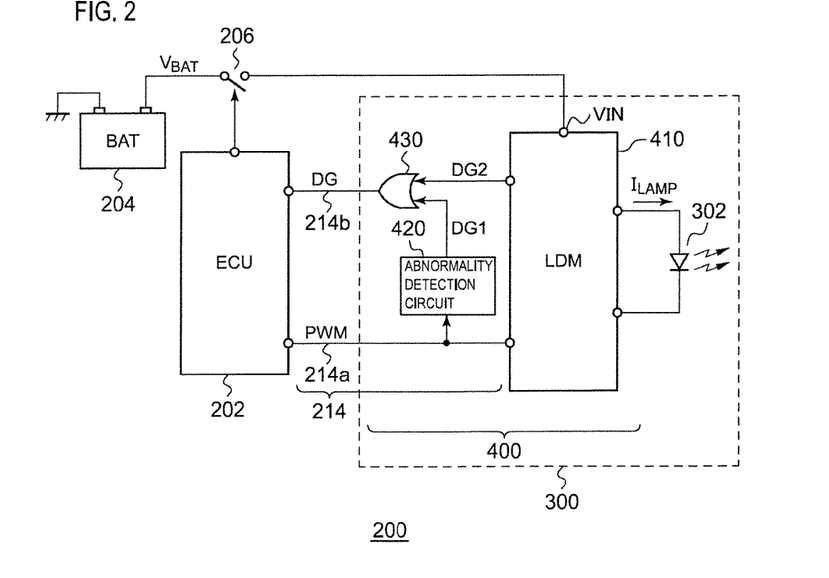
FIG. 2 is a block diagram of a lamp system including a lighting circuit according to an embodiment.

FIG. 2 is a block diagram of a lamp system 200 including a lighting circuit 400 according to an embodiment. The lamp system 200 includes an ECU (controller) 202, a battery 204, a switch 206 and a vehicle lamp 300. The ECU 202, the battery 204 and the switch 206 are basically the same as in FIG. 1.

The ECU 202 and the vehicle lamp 300 (lighting circuit 400) are connected by two wire harnesses 214 (214a, 214b). A PWM signal generated by the ECU 202 is transmitted to the wire harness 214a. Further, a diagnostic signal DG generated by the vehicle lamp 300 is transmitted to the wire harness 214b. The diagnostic signal DG is an abnormality detection signal that indicates abnormality or failure occurring in the vehicle lamp 300 or the wire harness 214 or the like.

The vehicle lamp 300 includes a semiconductor light source 302 and the lighting circuit 400. The lighting circuit 400 receives a PWM signal from the ECU 202, generates a drive current (lamp current) $I_{LAMP}$ to the semiconductor light source 302, and switches the drive current $I_{LAMP}$ according to the PWM signal.

When a non-input state of the PWM signal exceeds a predetermined time (determination time τ), the lighting circuit 400 asserts the abnormality detection signal, i.e., the above-described diagnostic signal DG and outputs the abnormality detection signal to the ECU 202. The assert may be a high level, a lower level, or a high impedance state. The determination time τ may be determined to be somewhat longer than the period of the PWM signal. Typically, since the PWM signal is on the order of several hundred Hz (period is several ms), the determination time τ can be set to several ten ms to several hundred ms.

The lighting circuit 400 functionally includes a drive circuit 410, an abnormality detection circuit 420, and an OR circuit 430. The drive circuit 410 has a constant current output and its drive current $I_{LAMP}$ can be switched according to the PWM signal. The drive circuit 410 asserts an abnormality detection signal DG2 when an abnormality is detected in the lighting circuit 400 or in the semiconductor light source 302. This abnormality detection signal DG2 is transmitted to the ECU 202 as the above-described diagnostic signal DG The abnormality detection circuit 420 detects an abnormality of the PWM signal, more specifically, an abnormality such as a ground fault or disconnection of the wire harness 214a. Specifically, when the non-input state of the PWM signal continues for the determination time τ, the abnormality detection circuit 420 asserts an abnormality detection signal DG1. The abnormality detection circuit 420 can be configured by a timer circuit.

Meanwhile, in FIG. 2, the abnormality detection circuit 420 and the OR circuit 430 are not necessarily hardware separate from the drive circuit 410 but may be integrated with (or incorporated in) the drive circuit 410.

The start of power supply to the lighting circuit 400 by the ECU 202, in other words, the turn-on timing of the switch 206 is synchronized with the supply start of the PWM signal. That is, the ECU 202 starts supplying the PWM signal at the same time as the turn-on of the switch 206 or after a lapse of a predetermined time from the turn-on of the switch 206 based on the activation time of the lighting circuit 400. In this case, the abnormality detection circuit 420 may start monitoring the PWM signal as soon as a power supply voltage $V_{BAT}$ is supplied to the vehicle lamp 300 (lighting circuit 400), and thus, the vehicle lamp 300 (lighting circuit 400) becomes operable.

The abnormality detection signal DG2 indicating an abnormality of the lighting circuit 400 and the abnormality detection signal DG1 indicating an abnormality of the PWM signal may be logically synthesized and supplied to the ECU 202 via a single signal line (wire harness) 214b. The OR circuit 430 logically synthesizes (logically sums) the two abnormality detection signals DG1, DG2 to generate the diagnostic signal DG The OR circuit 430 does not necessarily include an OR gate and may be configured such that the diagnostic signal DG is asserted when at least one of the two abnormality detection signals DG1, DG2 is asserted. Further, the OR circuit 430 may have an open-collector type output stage or an open-drain type output stage, or may have a driver (buffer) for driving the wire harness 214b.

Figure 3A:
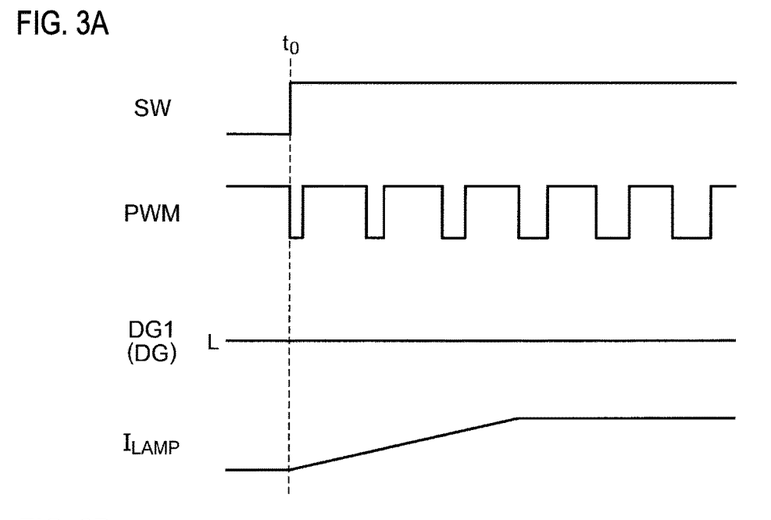
FIGS. 3A and 3B are operation waveform diagrams of the lamp system shown in FIG. 2 in a normal state and in an abnormal state.
Figure 3B:
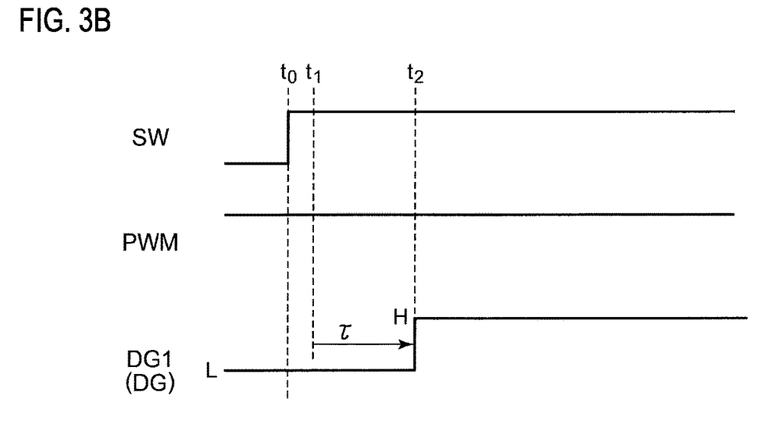

Hereinabove, the configuration of the lamp system 200 including the lighting circuit 400 has been described. Subsequently, an operation of the lamp system 200 will be described. FIGS. 3A and 3B are operation waveform diagrams of the lamp system 200 shown in FIG. 2 in a normal state and in an abnormal state. A vertical axis and a horizontal axis of a waveform or a time chart as used in the present specification are appropriately enlarged or reduced for ease of understanding. Further, each waveform shown is also simplified or exaggerated or emphasized for ease of understanding.

A signal SW indicating ON/OFF of the switch 206, the PWM signal, the diagnostic signal DG and the lamp current $I_{LAMP}$ are shown in FIG. 3. In the PWM signal, the low level corresponds to the turn on, and the high level corresponds to the turn off. Meanwhile, although the waveform of the lamp current $I_{LAMP}$ is actually switched according to the PWM signal, the average value thereof is shown in FIG. 3A.

Referring to FIG. 3A, an operation of the lamp system in a normal state will be described. Prior to time $t_0$, the switch 206 is in an off state and the PWM signal is at the high level (turn off). At time $t_0$, the ECU 202 turns on the switch 206 in order to turn on the semiconductor light source 302. When the ECU 202 turns on the switch 206, a battery voltage (power supply voltage) $V_{BAT}$ is supplied to the vehicle lamp 300, and the drive circuit 410 and the abnormality detection circuit 420 become operable. The ECU 202 generates the PWM signal together with the turn on of the switch 206. A duty ratio of the PWM signal may be gradually increased in order to gently increase the luminance of the semiconductor light source 302. The average value of the lamp current $I_{LAMP}$ varies according to the duty ratio of the PWM signal.

Referring to FIG. 3B, an operation of the lamp system in an abnormal state will be described. At time $t_0$, in order to turn on the semiconductor light source 302, the ECU 202 turns on the switch 206 and generates the same PWM signal as in FIG. 3A. By the way, due to the disconnection of the wire harness 214a, the PWM signal received by the lighting circuit 400 is at a constant level (as an example, high level). The abnormality detection circuit 420 starts measurement at time $t_1$. At time $t_2$ after the determination time τ elapses, the abnormality detection signal DG2 (DG) is asserted and notified to the ECU 202.

Hereinabove, the operation of the lamp system 200 has been described. According to this lamp system 200, a unit which detects an abnormality of the PWM signal is provided on the side of the lighting circuit 400, and the detection result is notified to the ECU 202. Therefore, the return line of the wire harness shown in FIG. 1 becomes unnecessary. That is, since the number of the wire harnesses can be reduced by one, the lamp system 200 can be simplified.

The present invention is not limited to specific configurations but extends to various devices and circuits which are grasped as the block diagram or circuit diagram in FIG. 2 or which are derived from the above description. Hereinafter, more specific configuration examples or embodiments will be described in order to aid understanding of the essence of the invention and the operation of circuit and to clarity them, not to narrow the scope of the present invention.

Figure 4:
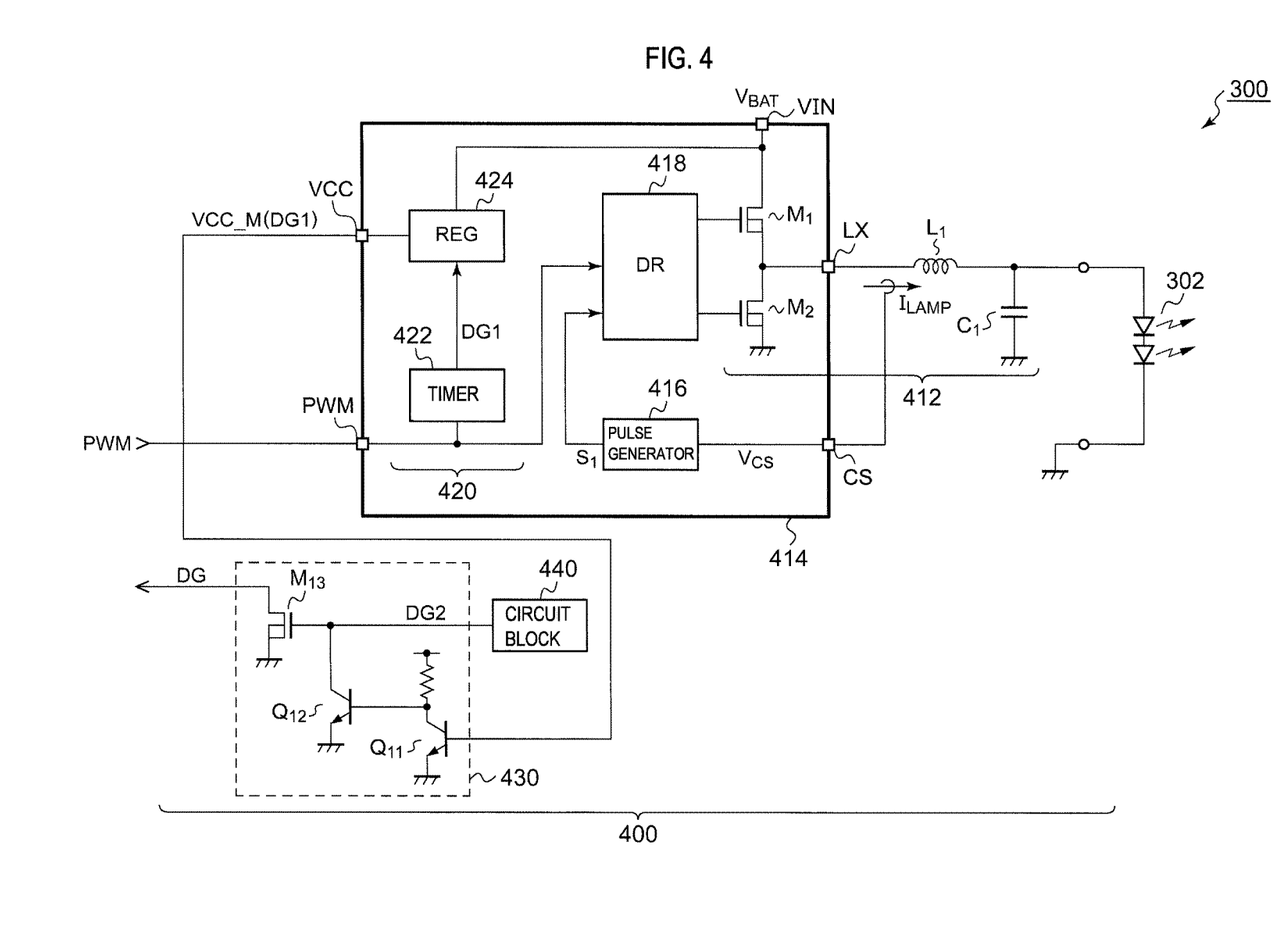
FIG. 4 is a block diagram of a configuration example of a vehicle lamp.

FIG. 4 is a block diagram of a configuration example of the vehicle lamp 300. The lighting circuit 400 includes a converter 412, a converter controller 414, the OR circuit 430 and a circuit block 440. The converter 412 is a step-down converter and includes a switching transistor $M_1$, a synchronous rectification transistor $M_2$, an inductor $L_1$ and a smoothing capacitor $C_1$. Note that the topology of the converter 412 is not limited thereto. Here, a bootstrap circuit for driving the switching transistor $M_1$ on the high side is omitted.

The converter controller 414 is a function IC for controlling the converter 412, and mainly includes a pulse generator 416 and a driver 418. The power supply voltage $V_{BAT}$ is inputted to an input (VIN) of the converter controller 414, a detection signal corresponding to the lamp current $I_{LAMP}$ is inputted to a CS (current detection) pin, and the PWM signal from the ECU 202 is inputted to a PWM pin. An LX (switching) pin is connected to the inductor $L_1$. The pulse generator 416 generates a pulse signal $S_1$ so that a detection signal Vcs approaches a target value. The pulse generator 416 may be configured by a pulse width modulator using an error amplifier or a pulse frequency modulator, or may be a controller for hysteresis control (Bang-Bang control).

The driver 418 switches the transistors $M_1$, $M_2$ based on the pulse signal $S_1$. Further, the driver 418 blocks the lamp current $I_{LAMP}$ during the period when the PWM signal instructs the turning off.

The converter controller 414 includes a timer circuit 422 and an internal power supply circuit 424. The internal power supply circuit 424 is, for example, a linear regulator. The internal power supply circuit 424 receives the voltage $V_{BAT}$ of the VIN pin and generates a stabilized power supply voltage $V_{CC\_M}$. The power supply voltage $V_{CC\_M}$ is outputted from the VCC pin of the converter controller 414 to the outside and is supplied to various circuits (not shown) outside the converter controller 414.

The timer circuit 422 receives the PWM signal and asserts the abnormality detection signal DG1 when the non-input state continues for the determination time τ. The internal power supply circuit 424 stops in response to the assert of the abnormality detection signal DG1. Meanwhile, the entire converter controller 414 may be shut down in response to the assert of the abnormality detection signal DG1. When the internal power supply circuit 424 is stopped, the power supply voltage $V_{CC\_M}$ becomes zero. The timer circuit 422 and the internal power supply circuit 424 correspond to the abnormality detection circuit 420 in FIG. 2. The power supply voltage $V_{CC\_M}$ also serves as the abnormality detection signal DG1.

The circuit block 440 is provided outside or inside the converter controller 414 and performs some kind of signal processing. Further, the circuit block 440 asserts the abnormality detection signal DG2 when an abnormality of the lighting circuit 400 is detected.

In FIG. 4, the assert of the abnormality detection signals DG1, DG2 is assigned to a low level. Further, the assert of the diagnostic signal DG is in an open state and the negate is in a low level.

When the abnormality detection signal DG2 is asserted, i.e., becomes a low level, a transistor $M_{13}$ is turned off and the diagnostic signal DG becomes an open state. Further, when the abnormality detection signal DG1 is asserted, i.e., when the power supply voltage $V_{CC\_M}$ becomes a low level, a transistor $Q_{11}$ of the OR circuit 430 is turned off, a transistor $Q_{12}$ of the OR circuit 430 is turned on, the transistor $M_{13}$ is turned off, and the diagnostic signal DG becomes an open state. When both the abnormality detection signals DG1, DG2 are negated (in a high level), the transistor $M_{13}$ is turned on and the diagnostic signal DG becomes a low level.

Figure 5:
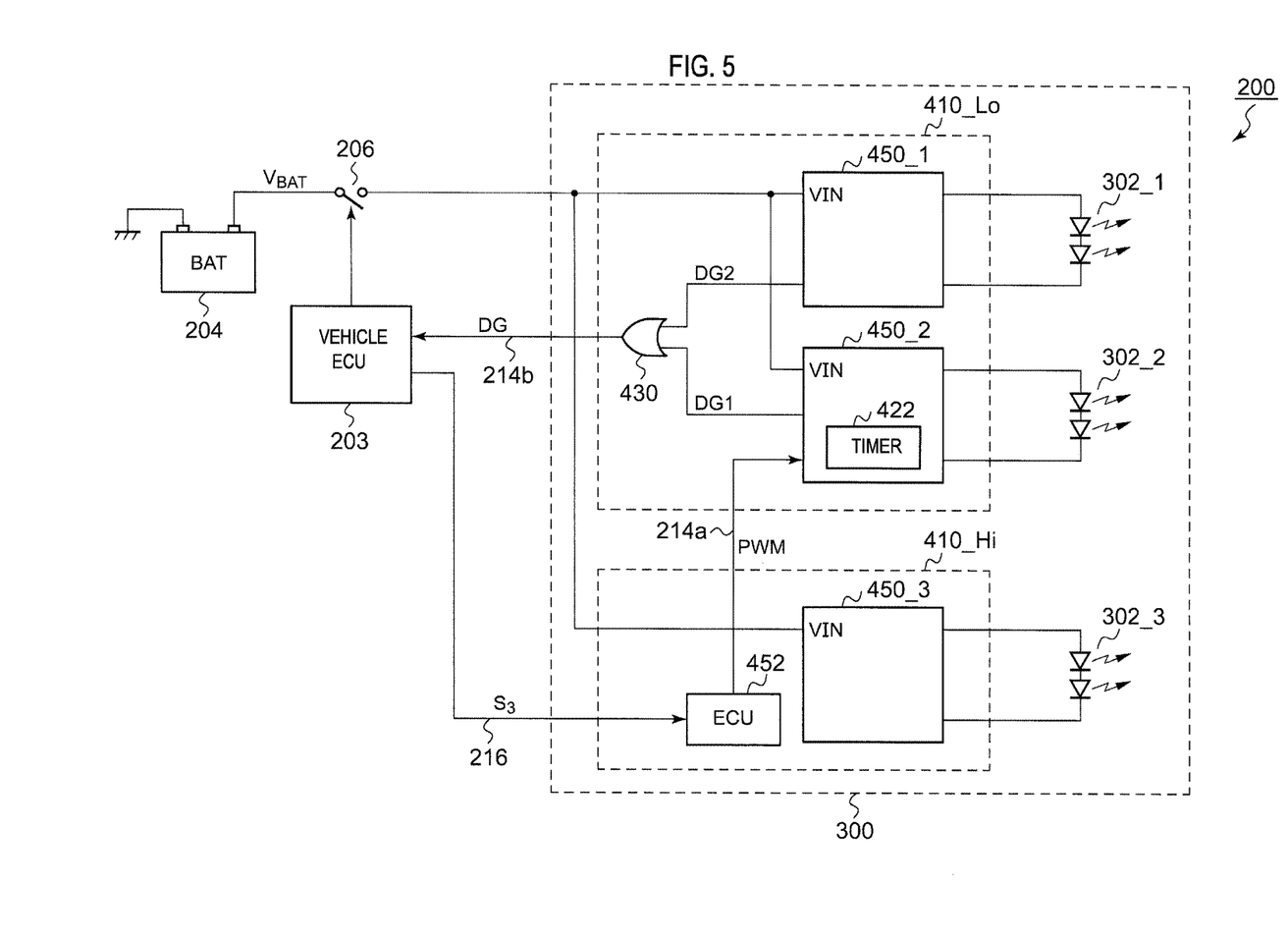
FIG. 5 is a block diagram showing another configuration example of the lamp system.

FIG. 5 is a block diagram showing another configuration example of the lamp system 200. The vehicle lamp 300 is composed of three lamps of a main low beam, an additional low beam and a high beam, and includes semiconductor light sources 302_1 to 302_3 corresponding thereto. A drive module 410_Lo for the low beam includes two drive circuits 450_1, 450_2, each of which turns on the corresponding semiconductor light source 302_1, 302_2 for the low beam.

A drive module 410_Hi for the high beam turns on the semiconductor light source 302_3 for the high beam. The drive module 410_Hi includes a lamp ECU 452 and a drive circuit 450_3.

The vehicle lamp 300 and the vehicle ECU 203 are connected to each other via a path 216 such as LIN (Local Interconnect Network) or CAN (Controller Area Network) and the wire harness 214b. The lamp ECU 452 receives, from the vehicle ECU 203, a control signal $S_3$ including ON/Off of a plurality of semiconductor light sources 302 and command values of luminance and the like. The luminance of the additional low beam is variable, and the control signal $S_3$ includes data indicating the luminance of the additional low beam. The lamp ECU 452 generates a PWM signal having a duty ratio corresponding to the data. The PWM signal is supplied to the drive circuit 450_2 via the wire harness 214a. The drive circuit 450_2 includes the timer circuit 422. When the non-input state of the PWM signal is detected to be longer than the determination time τ, the drive circuit 450_2 asserts the abnormality detection signal DG1. Further, the drive circuit 450_1 (and 450_2) asserts the abnormality detection signal DG2 when an abnormality is detected. The OR circuit 430 transmits the diagnostic signal DG based on the abnormality detection signals DG1, DG2 to the vehicle ECU via the wire harness 214b.

That is, it can be understood that, in the lamp system 200 in FIG. 5, the function of the ECU 202 in FIG. 2 is divided into the vehicle ECU 203 and the lamp ECU 452. In other words, in the present invention, the physical arrangement of the controller (ECU), the lighting circuit 400 and the abnormality detection circuit 420 is not particularly limited.

Figure 6:
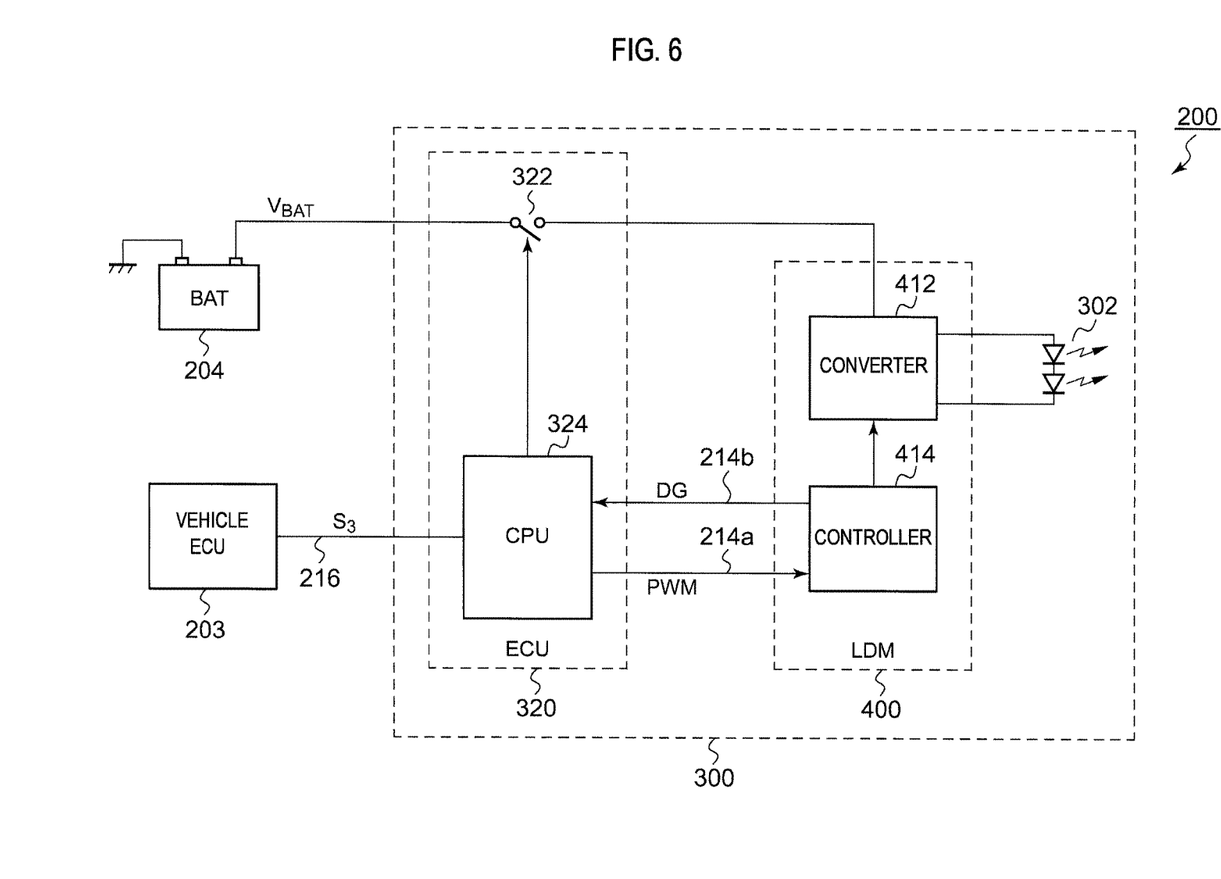
FIG. 6 is a block diagram showing yet another configuration example of the lamp system.

FIG. 6 is a block diagram showing yet another configuration example of the lamp system 200. Since a basic configuration of the lighting circuit 400 is the same as in FIG. 4, the lighting circuit 400 is shown in a simplified manner. The vehicle lamp 300 includes the lamp ECU 320. The lamp ECU 320 includes a switch 322 and a CPU (controller) 324. The switch 322 corresponds to the switch 206 in FIG. 2, and the CPU 324 corresponds to the ECU 202 in FIG. 2. The CPU 324 is connected to the vehicle ECU 203 via the path 216 and receives the control signal $S_3$. When the control signal $S_3$ instructs the turning on, the CPU 324 turns on the switch 322 and supplies the power supply voltage $V_{BAT}$ to the lighting circuit 400. Further, the CPU 324 generates a PWM signal having a duty ratio corresponding to the command value of the luminance of the semiconductor light source 302 and transmits the PWM signal to the lighting circuit 400 via the wire harness 214a. Further, when the non-input state of the PWM signal is detected, the lighting circuit 400 asserts the diagnostic signal DG The diagnostic signal DG is inputted to the CPU 324 via the wire harness 214b.

Although the present invention has been described using specific words and phrases and based on the embodiment, the embodiment merely illustrates the principle and application of the present invention. Many modifications and changes of arrangement are permitted to the embodiment without departing from the spirit of the present invention defined in the claims.

In the above embodiment, the case where the drive circuit 410 is constituted by the step-down convert has been described. However, the present invention is not limited thereto. For example, the drive circuit 410 may be a step-up/step down converter, or may be a combination of the step-up converter and the step-down converter, or may be a linear regular or a constant current circuit.

The semiconductor light source 302 is not limited to the LED, and may be an LD or an organic EL (Electro Luminescence).

What is claimed is:

1. A lighting circuit which lights a semiconductor light source, the lighting circuit comprising:
    a drive circuit configured to receive a PWM signal from a controller, to generate a drive current to the semiconductor light source, and to switch the drive current according to the PWM signal,
    wherein, when a non-input state of the PWM signal occurs for longer than a predetermined time, the lighting circuit is configured to assert an abnormality detection signal and to output the abnormality detection signal to the controller.

2. The lighting circuit according to claim 1, wherein a supply start of the PWM signal by the controller and a start of power supply to the lighting circuit by the controller are synchronized.

3. The lighting circuit according to claim 1, wherein
    the abnormality detection signal is a signal obtained by logically synthesizing a first abnormality detection signal indicating an abnormality of the PWM signal with a second abnormality detection signal indicating an abnormality of the lighting circuit, and
    the abnormality detection signal is supplied to the controller via a single signal line.

4. The lighting circuit according to claim 1, wherein
    the drive circuit comprises a converter, and a converter controller configured to control the converter according to the PWM signal, and
    the converter controller comprises a timer circuit configured to detect the non-input state of the PWM signal continuing for the predetermined time.

5. The lighting circuit according to claim 4, wherein
    the converter controller comprises a regulator configured to generate a power supply voltage used in the lighting circuit, and to shut down the power supply voltage when the non-input state of the PWM signal continuing for the predetermined time is detected, so that the abnormality detection signal supplied to the controller is in an asserted state.

6. A vehicle lamp comprising:
    a semiconductor light source; and
    a lighting circuit which lights the semiconductor light source, the lighting circuit comprising: a drive circuit configured to receive a PWM signal from a controller, to generate a drive current to the semiconductor light source, and to switch the drive current according to the PWM signal, wherein, when a non-input state of the PWM signal occurs for longer than a predetermined time, the lighting circuit is configured to assert an abnormality detection signal and to output the abnormality detection signal to the controller.

7. The vehicle lamp according to claim 6, further comprising:
    the controller configured to output the PWM signal to the lighting circuit and receive the abnormality detection signal form the lighting circuit.

8. A lamp system comprising:
    a semiconductor light source;
    a lighting circuit which lights the semiconductor light source, the lighting circuit comprising: a drive circuit configured to receive a PWM signal from a controller, to generate a drive current to the semiconductor light source, and to switch the drive current according to the PWM signal, wherein, when a non-input state of the PWM signal occurs for longer than a predetermined time, the lighting circuit is configured to assert an abnormality detection signal and to output the abnormality detection signal to the controller; and
the controller configured to output the PWM signal to the lighting circuit and receive the abnormality detection signal form the lighting circuit.

\* \* \* \* \*